2,912,407

PROCESS FOR STABILIZING OIL-EXTENDED RUBBER

Richard J. Reynolds, Walnut Creek, Calif., assignor to Shell Development Company, New York, N.Y., a corporation of Delaware No Drawing. Application November 19, 1956
Serial No. 622,804

5 Claims. (Cl. 260—33.6)

This invention relates to a process for stabilizing oil-extended rubber. More particularly, the invention pertains to a process for incorporating the stabilizer during coagulation of a latex of the rubber.

Beneficial processing characteristics are obtained by mixing vulcanizable or raw rubber with oil as an extender or softener. These oils are usually derived from petroleum. In recent years, so-called "cold rubber" has been processed and used by incorporation therein of extending oil. Most cold rubber is manufactured by polymerization at low temperature (5° C.) in aqueous emulsion of a conjugated diene, usually in conjunction with another monomer such as styrene, using an organic hydroperoxide as initiator and a ferrous pyrophosphate as activator. This cold rubber is contaminated with residual iron salts from the activator and these cause degradation. Although excellent vulcanizates may be prepared from oil-extended cold rubber, oxidative degradation of the extended raw rubber has long been a serious problem, especially when the extending oil is what was designated by the Office of Synthetic Rubber of the Reconstruction Finance Corporation (R.F.C.) as an aromatic or highly aromatic oil. The oxidative degradation is manifested during drying, storage, mastication and heat aging by pronounced decreases of Mooney viscosity and molecular weight, and increases in plasticity, tack and gel content. At times, the raw oil-extended rubber after relatively short periods of storage has degraded to a worthless sticky mass.

Many attempts have heretofore been made to overcome this oxidative degradation with little success. Thus, it has been proposed to prepare the rubbery butadiene-styrene copolymer using a recipe containing only a minute amount of iron. While effective, the recipe is not as reliable as the pyrophosphate recipe in that die outs, slow polymerization rates, etc. occur and most cold rubber is therefore produced commercially using the pyrophosphate recipe. It has also been proposed to add a chelating agent for the iron such as Versene Fe-3 to the oil extended rubber blend, but this gives only temporary stabilization which does not persist on prolonged aging to which the product may be subjected.

As explained in my copending application Serial No. 594,374, filed June 28, 1956, I discovered that by incorporating a magnesium salt of an organic acid of at least 6 carbon atoms into a rubber composition comprising a mixture of vulcanizable rubber contaminated with a salt of iron or like multivalent metal capable of existing in two valence states, and a compatible oil softener for the rubber, the expected oxidative degradation of the rubber composition is effectively suppressed. Although as little as 20 parts by weight of metal of the contaminating salt per million of the rubber cause appreciable oxidative degradation, probably by catalytic action, the added magnesium salt effectively inhibits the degradation both at such low metal content and at many times the stated amount.

While my copending application Serial No. 594,374 claims the stabilized compositions and describes several methods for preparing them, I have discovered another process for incorporating a stabilizing magnesium salt into rubber. According to the process of the present invention, magnesium is incorporated into rubber contaminated with the salt of a multivalent metal such as iron by coagulating a latex of the rubber containing a water-soluble carboxylic acid salt emulsifier in the presence of a controlled amount of a water-soluble magnesium salt. The amount of magnesium used is sufficient to provide in the coagulum at least one mole of magnesium per mole of contaminating iron or like multivalent metal, but is less than that which will combine with all of the carboxylic acid salt emulsifier. The resulting product, by containing the magnesium salt of the emulsifier, may be compounded with extending oil and has the tendency toward oxidative degradation effectively suppressed even though the rubber also contains the catalyzing iron or like metal salt. Instead of compounding the rubber with oil after coagulation, a blend of emulsified extending oil and latex of rubber may be subjected to co-coagulation in the presence of the magnesium salt to thereby incorporate the stabilizer in a masterbatch of the oil and rubber. It is thus evident that the present method is well suited for application to current commercial processes for production of cold synthetic rubber by emulsion polymerization of conjugated dienes alone or in admixture with other monomers. Such processes employ alkali metal soaps of disproportionated rosin acid or mixtures of this acid and stearic acid (from hydrogenated tallow) as emulsifying agent. The rubber in the resulting latex is normally recovered by creaming with brine and then coagulating with dilute acid whereby the carboxylic acid of the emulsifier soap is retained in the coagulum as free acid. The creaming and coagulating operation is described in the patent of C. F. Fryling, U.S. 2,378,695, dated June 19, 1945. Having free carboxylic acid from the emulsifier present in the rubber is essential for subsequent vulcanization of the rubber where it acts in combination with the zinc oxide, the vulcanization accelerator and the sulfur to give vulcanizates having satisfactory properties. By using controlled amounts of water-soluble magnesium salt in the coagulating operation with acidic coagulants according to the process of the present invention, the resulting coagulum contains sufficient magnesium to counteract the effect of the contaminating iron and like multivalent metal salts in catalyzing the oxidative degradation, but at the same time, permits the coagulum to contain free acid from the carboxylic acid salt emulsifier. The process thus enables new and advantageous results to be obtained. While it is possible to coagulate the latex by mixing with an aqueous solution containing only a magnesium salt, such a coagulation not only gives a coagulum of coarse crumb size which does not dry properly, but also, normally converts all of the carboxylic acid salt to insoluble magnesium soap so that no free acid is left for action in the subsequent vulcanization.

The process of the invention includes blending together of (1) an aqueous latex of vulcanizable rubber contaminated with salt of a multivalent metal capable of existing in two valence states in amount of at least 20 parts by weight of the metal per million of the rubber and which latex contains a carboxylic acid salt emulsifier, and (2) an aqueous emulsion of compatible oil softener for the rubber. The resulting blend is then coagulated in the presence of a controlled amount of a water-soluble magnesium salt. The flocculation of the blend of oil and rubber may be effected using "shock" coagulation by mixing the blend with an aqueous solution of acid, the acid being at least as strong as acetic acid. The acid solution also contains the water-soluble magnesium salt. In this case, the prior creaming operation is not used. More preferably, the blend is first creamed by mixing with an aqueous solution of an alkali metal halide and the creamed product is then coagulated by admixture with an aqueous solution of acid containing the magnesium salt. While the water-soluble magnesium salt may be present in either the creaming solution, or the acidic coagulating solution, or both, better results and avoidance of premature coagulation, are obtained by having the magnesium salt present in only the acidic coagulating solution.

The aqueous latex employed in the process contains a vulcanizable rubber contaminated with the oxidation promoting multivalent metal salt. The vulcanizable rubber is any of the various rubbery polymers or copolymers since the magnesium is particularly effective for stabilizing against oxidative degradation of synthetic rubber which is vulcanizable rubbery polymers of a conjugated diene, preferably of up to 8 carbon atoms. These are exemplified by homopolymer of butadiene, isoprene, 2-methylpentadiene-1,3, 2-methylpentadiene-2,4, piperylene, 2-furylbutadiene-1,3, 2-methoxybutadiene-1,3, 2-cyanobutadiene-1,3, 2-chlorobutadiene-1,3 2-bromobutadiene-1,3, 2,3-dimethylbutadiene-1,3, 2-phenylbutadiene-1,3 and the like as well as copolymers of one or more of conjugated dienes, or of one or more dienes with one or more mono-olefinic compounds including arylolefins such as styrene, methylstyrene, alpha-methylstyrene, chlorostyrene, p-methoxystyrene, vinylnaphthalene and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethylmethacrylate, butl methacrylate, methyl ethacrylate, acrylonitrile, methacrylonitrile, and the like; and unsaturated aldehydes, ketones, etc. such as isobutylene, isoamylene, methyl vinyl ketone, methyl isopropenyl ketone, acrolein, methacrolein, methyl vinyl ether, vinylethinyl alkyl carbinol, vinyl acetate, vinyl chloride, vinylidene chloride, vinylfurane, vinylpyridine, 2-methyl-5-vinylpyridine, vinylcarbazole, vinylacetylene and other unsaturated hydrocarbons, esters, alcohols, acids, ethers, etc. The copolymers generally contain a major proportion of bound conjugated diene. The invention is very suitable with butadiene-styrene copolymer containing a weight ratio of butadiene to styrene of about 50:50 to 85:15, particularly about 75:25. The method used in forming the polymers is not important and they may also be natural polymers (Hevea or Ficus rubber).

Usually the latex is one obtained by polymerizing the monomer in aqueous emulsion using the customary carboxylic acid salt emulsifier. The emulsifier is a monocarboxylic acid salt of an alkali metal such as sodium and/or potassium. Particular acids (used as their soaps) are exemplified by fatty acids containing about 10 to 22 carbon atoms such as capric, lauric, myristic, palmitic, stearic, arachidic, hexenic, oleic, linoleic, linolenic and ricinoleic acids. The saturated fatty acids are preferred. Other acids include the rosin acids such as disproportionated rosin acid obtained by treating natural rosin in such a way that selective dehydrogenation and hydrogenation occur. Specific examples or rosin acids include abietic acid, and dehydro-, dihydro- and tetrahydro-abietic acids. Alkali metal salts of saturated fatty acids of 10 to 22 carbon atoms or rosin acids or mixtures thereof are very suitable. Ordinarily the emulsifier constitutes about 2 to 10%, particularly about 4 to 7%, of the rubber.

The aqueous latex of the rubber usually contains about 15 to 30% by weight of rubber solids although it may be higher or lower such as about 5 to 40% or more. In order to ensure formation of porous crumbs of uniform crumb size to permit proper drying, it is advantageous at times to dilute the latex to about 10 to 20% rubber solids content.

The metal salts contaminating the rubber and causing the oxidative degradation are salts of one or more of a variety of metals. A serious offender is an iron salt although salts of other multivalent metals capable of existing in two valence states also have their ability to cause degradation effectively suppressed by the magnesium salt. Such other multivalent metals include manganese, cobalt, copper, vanadium, chromium, nickel, and the like, all of which are oxidation catalysts when present as salts. The acid portion of the salts is probably most varied, and in any event is not important. Since various emulsifiers are used for emulsion polymerization employing a redox recipe with a multivalent metal salt as activator, the metal may be combined as salt with the acids of the emulsifier acid. Further, in natural rubber latex, the metal may be present as salt by contamination. The amount of the contaminating may vary widely in the rubber. When there is present about 20 parts by weight of metal per million of rubber, the oxidative degradation of the oil-extended rubber is appreciable. At higher metal contents such as 200 to 1000 or even more parts per million of rubber, the oxidative degradation (in the absence of magnesium) is very marked.

The oil used as extended or softener in the rubber is preferably of the usual type. These are ordinarily derived from petroleum although they may be from coal tar or any other suitable source. Generally, they have a viscosity of from about 10 cs. at 210° F. up to more or less solid materials softening at about 100 to 200° F., have a boiling point of at least 300° F. at 10 mm. Hg, and have a specific gravity (60/60° F.) of about 0.9 to 1.05. These are primarily higher hydrocarbons and may be vacuum distillates of petroleum as well as extracts and/or raffinates of such distillates. Also suitable are residues of petroleum distillation operations.

The principle of the invention is particularly effective for rubber extended with high boiling extracts of petroleum. These extract oils are materials well known in the art. The extracts are obtained by extracting petroleum with solvents having preferential selectivity for aromatics and naphthenes. To obtain such extracts, various nonreactive, highly polar, aromatically preferential solvents are used such as liquid sulfur dioxide, phenol, cresylic acid, furfural, beta,beta'-dichloroethyl ether, nitrobenzene and the like. Combination solvents like phenol with cresylic acid, or liquid sulfur dioxide with benzene or toluene are sometimes used. The use of the so-called double solvent process employing mutually immiscible solvents such as phenol and propane give excellent extending oils. Many of such extracts are obtained as by-products from manufacture of lubricating oils, and thus are commercially available in very large quantities. Particular reference is made to extracts from bulk vacuum distillate fractions or cuts from California, Mid-Continent or Gulf Coast crudes used in manufacturing lubricating oils by solvent refining methods. Especially suited are extending oils of this type known as highly aromatic oils and aromatic oils by R.F.C. According to the Rostler method of analysis (Ind. Eng. Chem., 41, 598 (1949)), such highly aromatic processing oils contain about 10 to 25% nitrogen bases extractable with 85% sulfuric acid, about 12 to 28% group I unsaturated hydrocarbons extractable with 97% sulfuric acid, about 15 to 40% group II unsaturated hydrocarbons extractable with 106.75% sulfuric acid, and about 5 to 15% saturated hydrocarbons. Likewise, such aromatic oils contain up to about 12% nitrogen bases, about 8 to 21% group I unsaturated hydrocarbons, about 48 to 65% group II unsaturated hydrocarbons and about 15 to 32% saturated hydrocarbons. Very suitable oils boil above about 300° F. at 10 mm. Hg pressure and contain at least 60% by weight of hydrocarbons extractable by sulfuric acid of about 95 to 110% strength after extraction of nitrogen bases by 85% sulfuric acid therefrom, the extractions being conducted at about 25° C.

Properties of three typical oils used to soften rubbers are given in the table below. The composition of the oils was determined according to the Rostler method (Ind. Eng. Chem., 41, 598 (1949)).

| RFC Designation | Naphthenic Circosol 2 XH | Aromatic Shell SPX-97 | Highly Aromatic Dutrex 20 |
| --- | --- | --- | --- |
| Trade Name | | | |
| Specific Gravity, 60° F./60° F | 0.95 | 0.98 | 1.04 |
| Viscosity at 210° F., SUS | 90 | 85 | 106 |
| Composition, percent: | | | |
| Nitrogen bases | 1.0 | 9.0 | 21.9 |
| Unsat. HC, Group I | 4.4 | 18.7 | 26.4 |
| Unsat. HC, Group II | 43.7 | 52.1 | 45.9 |
| Sat. HC | 50.9 | 20.2 | 5.8 |

Although the aqueous rubber latex may be coagulated in the presence of the controlled amount of magnesium salt, and then the dried coagulum compounded with the extending oil, it is preferred to masterbatch the oil with the rubber latex and then subject the mixture of latex and emulsified oil to coagulation in the presence of the magnesium salt. For this purpose, an aqueous emulsion of the oil is prepared in customary manner using the usual emulsifying agents such as alkali metal soaps of fatty acids, alkane or alkylaryl sulfonic acids having an alkyl group of 8 to 20 preferably about 10 to 16 carbon atoms, and the like. It is convenient to form the emulsifier in situ during emulsification by turbulently mixing a mixture of the oil and emulsifier acid with an aqueous solution of alkali metal hydroxide or other base. The oil content of the emulsion may be varied widely, but usually is from about 25 to 75%.

In masterbatching the rubber latex with the oil emulsion, the two aqueous materials are mixed in proportions such that the resulting rubber composition contains a major amount of rubber and a minor amount of oil. A particular proportion of rubber and oil is readily obtained by mixing appropriate amounts of rubber latex and oil emulsions as governed by the rubber and oil contents of the aqueous dispersions. Excellent compositions are obtained using rubber having a plasticity measured as Mooney value or viscosity (ML-4 at 212° F.) of at least 80. More particularly, rubbers such as GR-S having a Mooney viscosity of about 100 to 140 are very suitable. Although governed to some extent by the particular rubber, the character of the extending oil and the intended end use, the oil is generally used in amounts of from about 10 to 100 parts by weight of oil per 100 parts of rubber, particularly from about 20 to 50 parts of oil per 100 of rubber.

When the latex of contaminated rubber, or the blend of latex and oil emulsion are first subjected to creaming, this is effected by mixing with an aqueous solution of water-soluble alkali metal salt of a water-soluble acid such as sodium chloride, potassium chloride, sodium bromide, lithium iodide, sodium sulfate, sodium nitrate, sodium phosphate, potassium bisulfate, and the like. Sodium chloride is most preferred. The aqueous solution generally contains from about 10 to 15% salt although higher or lower amounts are also suitable such as from about 5% up to the saturation concentration. Sufficient of the creaming solution is mixed with the latex, or the blend of latex and emulsified oil, to salt out the fatty acid emulsifier and cause the particle size to increase. Ordinarily an amount of salt of about 5 to 50% of the rubber solids, or rubber solid and oil blend, is adequate to effect the creaming. In conducting the creaming operation, the salt solution is mixed with the emulsified latex using good agitation. The temperature may vary considerably although atmospheric temperature is usually used. Satisfactory results are obtained at from about 10° C. to 50° C. When the creaming solution contains the magnesium salt, sufficient time of stirring of the creaming mixture is allowed for adequate incorporation of the magnesium as magnesium soap of the carboxylic acid salt emulsifier to occur such as from about 1 to 30 minutes.

The creamed mixture is then mixed with the acid coagulating bath. For this purpose, an aqueous solution of acid is used. Any of the relatively strong acids are suitable—i.e. the acid is at least as strong as acetic acid as is the case with sulfuric acid, hydrochloric acid, acetic acid, trichloroacetic acid, formic acid, etc. The aqueous solution is perferably quite dilute; excellent results being obtained with solutions containing about 0.2 to 3% of acid, especially sulfuric acid. The coagulant is used in such an amount that the coagulated mixture has a pH of about 2 to 5 which assures that the alkali metal soap emulsifier is converted to free acid. In conducting the coagulation, which may be effected either with or without the prior creaming step, good agitation is again used. Preferably, the intermingling is effected with turbulent mixing or impingement of the dispersion into the coagulant. The temperature is the same or similar to that employed in the creaming step, if used. Adequate time of mixing is permitted to effect good soap conversion.

As pointed out above the essence of the present invention resides in conducting the salt creaming and/or acid coagulation in the presence of a water-soluble magnesium salt. Thus, either the creaming solution or the coagulating solution or both contains a water-soluble magnesium salt. Various magnesium salts are suitable for this purpose such as magnesium sulfate, chloride, nitrate, bromide, iodide, acetate, formate or the like as well as mixtures of two or more. Most convenient for use in the process is Epsom salt or $MgSO_4 \cdot 7H_2O$ especially when the creaming solution is aqueous sodium chloride and the coagulant is dilute (0.25%) aqueous sulfuric acid.

The amount of magnesium salt used is governed primarily by the quantity of iron or like multivalent metal salt contained as contaminant in the rubber. The magnesium salt should be used in such amount that at least a mole (an atom weight) of magnesium is combined in the coagulated rubber per mole of iron or like multivalent metal there present. Thus, when the rubber contains, for example, about 550 parts by weight of iron per million of rubber, there should be combined in the rubber at least an equivalent atom weight or mole of magnesium which in this case would be 243 parts of magnesium per million of rubber. Preferably there is used an amount of magnesium such that about 2 to 4 or more moles of magnesium is present in the rubber coagulum per mole of contaminating multivalent metal or metals present. The extent of pick-up of magnesium into the rubber from the creaming and/or coagulating solution is about 50 to 80%. Consequently at least about 2 moles of magnesium is used in the creaming and/or coagulating solution per mole of multivalent contaminating metal such as iron contained in the rubber which is coagulated. If the magnesium salt is present in both the creaming solution and the coagulating solution, then the sum of the magnesium contents of the two solutions is at least the two molar quantity. Preferably in order to assure good stabilization of the oil-extended rubber product, there is used from 4 to 8 or more moles of magnesium per mole of the contaminating metal.

The upper limit of the magnesium salt used is controlled so that there is less than the amount that will combine chemically with all of the carboxylic acid salt emulsifier present in the rubber (and oil, if used). This enables free carboxylic acid from the emulsifier to be present in the product. Preferably, the amount of magnesium used is such that at least one-half of the emulsifier acid is present in the product as free acid. The amount is readily ascertained by recognizing that for each magnesium ion, two equivalents or carboxylic acid groups are capable of combining therewith to formz a water-insoluble magnesium salt since magnesium ion has a valency or combining power of 2. The use of larger amounts of magnesium ion such that no free acid will be present in the product is possible, but it is not desirable for the reasons explained earlier.

Although the process of the invention has been described as embodying simultaneous use of the magnesium salt with the active constituents in the creaming solution and/or coagulating solution, the magnesium can be incorporated into the rubber by different means. Thus an aqueous solution of the magnesium salt alone may be mixed with the rubber before or after creaming and/or coagulating. However, such means are so much less satisfactory in achieving good stabilizing action that they are not desirable. Furthermore, such means give inferior crumb sizes and drying qualities.

After effecting coagulation, the serum is removed from the coagulum by decanting, filtration, centrifugation or the like and the coagulum is washed copiously with water. The coagulum is washed until the pH of the used wash water equals or approaches the pH of the original water. The coagulum separated from the wash water is then dried in usual fashion with hot air.

As pointed out and shown in my afore-mentioned co-pending application Serial No. 594,374, the magnesium salt of the carboxylic acid contained in the oil-extended rubber is unique in stabilizing action against oxidative degradation. Thus corresponding salts of such metals as aluminum, calcium, lead and tin fail to produce the highly effective stabilizing action as do the salts of magnesium.

A specific embodiment of the process of the invention is given in the following example wherein a latex of cold butadiene-styrene synthetic rubber contaminated with iron was masterbatched with a dispersion of highly aromatic extending oil, and the mixture was creamed with brine and coagulated with dilute aqueous sulfuric acid containing a controlled amount of water-soluble magnesium salt to thereby obtain a product resistant against oxidative degradation.

The latex employed was the base latex used in producing GR-S 1712 which is normally prepared for sale as masterbatch rubber containing 37.5 parts by weight of highly aromatic oil extender per 100 parts of latex solids (rubber). The 1712 latex, is produced in a sugar-free recipe by copolymerizing butadiene-1,3 and styrene in aqueous emulsion at 5° C. to give a high Mooney polymer using a mixed emulsifier consisting of potassium salt of disproportionated rosin acid (Dresinate 214 from Hercules Powder Co.) and sodium salt of hydrogenated tallow fatty acids. The initiator used is p-menthane hydroperoxide and the activator is iron pyrophosphate. The latex contains about 22.5% solids and the copolymer about 23.5% bound styrene. The latex also contained about 1.2%, based on rubber solids, of a usual heat stabilizer, phenyl-beta-naphthylamine, which is ineffective in preventing oxidative degradation.

The emulsion of oil for masterbatching was prepared using the following recipe wherein the parts are by weight.

| | Parts |
|---|---|
| Dutrex 20 | 500 |
| Oleic acid | 10 |
| 1% aqueous NaOH | 113 |
| Distilled water | 336 |

The oil and acid were heated to about 95° C. and agitated by a stirrer. The distilled water containing the dilute caustic, also heated to about 95° C., was slowly added until the mixture became thick and pasty (inversion point) whereupon the addition of caustic was stopped and the mixture agitated violently to take advantage of the high viscosity to produce greater shearing action and finer particle size. The addition of caustic was then completed and the resulting emulsion, containing about 50% oil, cooled to room temperature.

About 2220 parts (all parts are by weight) of the 1712 latex and about 375 parts of the Dutrex 20 emulsion were mixed and blended together with mild agitation at room temperature (about 30° C.). About 2320 parts of aqueous sodium chloride solution containing 10% salt was added to the blend in one portion with vigorous agitation and creamed for about 15 minutes. The creamed mixture was then coagulated by adding slowly during 65 minutes' time about 2500 parts of 0.25% aqueous sulfuric acid which also contained 10.85 parts of $$MgSO_4 \cdot 7H_2O$$

so as to reach a pH of 4.0. The coagulated mixture was agitated another 30 minutes for soap conversion and then the major portion of the serum was removed from the coagulum. The coagulum was slurried with distilled water having a pH of 6.1 to give a slurry with pH of 5.1. After separation from the wash water, the coagulum was again slurried with fresh distilled water, this slurry having a pH of 5.7. The coagulum was next filtered on a stainless steel screen to give a loose sheet of about one-eighth inch thickness. The sheet was dried in a forced draft air oven, care being used to remove the coagulum as soon as dry. No appreciable oxidative degradation occurs during this drying procedure because the evaporating water keeps air from contact with the polymer. The dry coagulum (675 parts) was extruded through a spaghetti die to give uniform shreds about 0.09 inch thick. Analysis showed the coagulum to contain 780 p.p.m. (parts per million) of magnesium and 350 p.p.m. of iron. The pick-up of the magnesium from the coagulant was thus about 50% complete. The product contained about 3% free organic acid.

A control product was prepared in identical manner to that described above except that the magnesium salt in the coagulant was omitted.

Oxidative degradation was determined by measuring the Mooney viscosity (ML-4 at 212° F.) before and after heating the shreds in a forced draft air oven at 60° C. for the times given in the table below.

| Magnesium Salt Used | Yes | | No (Control) | |
|---|---|---|---|---|
| Aged at 60° C., days | Mooney Viscosity | Percent Viscosity Retention | Mooney Viscosity | Percent Viscosity Retention |
| None | 59.5 | | 50.5 | |
| 2 | 62 | 104 | 28.0 | 56 |
| 3 | 63.5 | 107 | 18.5 | 37 |
| 5 | 58.5 | 98 | 12 | 24 |

Like results are obtained by incorporating the same or other water-soluble magnesium salts in both creaming and coagulating solutions, or in only the creaming solution, or only in the acidic coagulating solution without use of any prior creaming operation. Moreover, the process gives stabilized compositions of other extending oils with other rubbers containing iron salt or other contaminating multivalent metal salts.

The stabilized compositions obtained by the process of the invention are very useful and are suitable for manufacture of all types of fabricated rubber articles. For this purpose, the usual other compounding ingredients are incorporated in the stabilized oil-extended rubber compositions such as sulfur, vulcanization accelerators, fillers, reinforcers, carbon black and the like. If desired, the rubber latex and oil emulsion may be mixed with a slurry of carbon black before coagulation in order to masterbatch the carbon black into the composition during execution of the process of the invention. It is noteworthy that the presence of the magnesium salt in the product has no adverse effect on the properties of the vulcanizates and they may be used for such articles of commerce as tires, tire treads, belting, hoses, gaskets, etc.

I claim as my invention:

1. A process for producing a rubber composition stabilized against oxidative degradation which comprises blending together (1) an aqueous latex of vulcanizable rubbery polymer of a conjugated diene containing up to 8 carbon atoms contaminated with from 20 to 1000 parts per million of the rubbery polymer of iron pyrophosphate which latex contains from 2 to 10% by weight of the rubbery polymer of a carboxylic acid salt emulsifier of the group consisting of sodium and potassium salts of fatty acids containing 10 to 22 carbon atoms, abietic acid, dehydro-abietic acid, dihydro- and tetrahydro-abietic acids, and (2) an aqueous emulsion of compatible petroleum oil softener for the rubber, the said softener having a viscosity between about 10 and 106 cs. at 210° F., specific gravity 60/60° F. of between about 0.9 and 1.05, boiling point above 300° F. at 10 mm. and having been obtained by extracting petroleum with a solvent of the group consisting of liquid sulfur dioxide, phenol, cresylic acid, furfural, beta,beta'-dichloroethyl ether and nitrobenzene, and said oil softener being present in the blend in an amount varying from 10 to 100 parts per 100 parts of rubbery polymer, and coagulating the blend by mixing with an aqueous solution of an acid of the group consisting of sulfuric, hydrochloric, acetic, trichloroacetic and formic acids and which aqueous solution also contains a water-soluble salt of magnesium selected from the group consisting of magnesium sulfate, magnesium chloride, magnesium nitrate, magnesium bromide, magnesium iodide, magnesium acetate and magnesium formate, in an amount sufficient to furnish 1 to 8 moles of magnesium per mole of contaminating iron.

2. A process as in claim 1 wherein the iron pyrophosphate is present in an amount varying from 150 to 500 parts by weight of iron per million parts of the rubbery polymer.

3. A process as in claim 1 wherein the rubbery polymer is a copolymer of butadiene and styrene, the carboxylic acid salt emulsifier is a sodium salt of a fatty acid containing 10 to 22 carbon atoms, and the coagulating solution contains sulfuric acid as the acid and magnesium sulfate as the magnesium salt.

4. A process as in claim 1 wherein the blend of latex of rubbery polymer and aqueous emulsion containing the petroleum oil softener is creamed by mixing with an aqueous solution of an alkali metal halide prior to coagulation with the aqueous solution of the acid and magnesium salt.

5. A process for making a rubbery polymer of a conjugated diene resistant against oxidative degradation when combined with from 10 to 100 parts per 100 parts of rubber of a compatible petroleum oil softener for the rubber, the said softener having a viscosity between about 10 and 106 cs. at 210° F., specific gravity 60/60° F. of between about 0.9 and 1.05, boiling point above 300° F. at 10 mm. and having been obtained by extracting petroleum with a solvent of the group consisting of liquid sulfur dioxide, phenol, cresylic acid, furfural, beta,beta'-dichloroethyl ether and nitrobenzene, and contaminated with from 20 to 1000 parts per million parts of rubber polymer of iron pyrophosphate which comprises coagulating an aqueous latex of the said rubbery polymer which contains as an emulsifier from 2 to 10% by weight of rubber of a salt of the group consisting of sodium and potassium salts of fatty acids containing 10 to 22 carbon atoms, abietic acid, dehydroabietic acid, dihydro- and tetrahydro-abietic acids, with an aqueous solution of an acid of the group consisting of sulfuric, hydrochloric, acetic, trichloroacetic and formic acids, which solution also contains a water-soluble salt of magnesium selected from the group consisting of magnesium sulfate, magnesium chloride, magnesium nitrate, magnesium bromide, magnesium iodide, magnesium acetate and magnesium formate, in an amount sufficient to furnish 1 to 8 moles of magnesium per mol of contaminating iron.

References Cited in the file of this patent

UNITED STATES PATENTS 2,419,512     Vesce     Apr. 22, 1947

OTHER REFERENCES

"Oil-Extended GR–S, The Rubber Age and Synthetics," volume 32, #6, August 1951, pages 197, 198, and 200.